(12) United States Patent
Delaney et al.

(10) Patent No.: US 10,805,310 B2
(45) Date of Patent: Oct. 13, 2020

(54) CONTENT AVAILABILITY MODIFICATION

(71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 253 days.

(21) Appl. No.: 16/100,686

(22) Filed: Aug. 10, 2018

(65) Prior Publication Data

US 2020/0053098 A1 Feb. 13, 2020

(51) Int. Cl.
*H04L 29/06* (2006.01)
*G06F 17/10* (2006.01)
*G06F 1/03* (2006.01)
*G06F 16/901* (2019.01)
*G06Q 50/00* (2012.01)

(52) U.S. Cl.
CPC ............ *H04L 63/108* (2013.01); *G06F 1/03* (2013.01); *G06F 16/9017* (2019.01); *G06F 17/10* (2013.01); *G06Q 50/01* (2013.01)

(58) Field of Classification Search
CPC .................................................... H04L 63/108
USPC ............................................................ 726/3
See application file for complete search history.

(56) References Cited

U.S. PATENT DOCUMENTS

| | | | |
|---|---|---|---|
| 9,294,425 B1 * | 3/2016 | Son ...................... | H04L 51/18 |
| 10,110,942 B2 * | 10/2018 | Lyons .................. | G11B 27/031 |
| 10,496,272 B1 * | 12/2019 | Lonkar ................ | G06F 3/0482 |
| 2020/0053206 A1 * | 2/2020 | Kats ..................... | H04M 1/576 |

* cited by examiner

*Primary Examiner* — Peter C Shaw
(74) *Attorney, Agent, or Firm* — Schwegman Lungberg & Woessner, P.A.

(57) ABSTRACT

A computer implemented method includes receiving ephemeral digital information from a source user, providing access to the ephemeral digital information to one or more recipient users in accordance with a time decay value associated with the ephemeral digital information, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

15 Claims, 3 Drawing Sheets

| VIEWER | RELATIONSHIP SCORE | DECAY PERIOD |
|---|---|---|
| DAN | 0.99 | 30 HOURS |
| DAVE | 0.81 | 24 HOURS |
| DINA | 0.44 | 16 HOURS |
| ⋮ | ⋮ | ⋮ |
| DANIELLE | 0.11 | 7 HOURS |
| SOCCER GROUP | 0.50 | 20 HOURS |

300 →

| VIEWER | AVAILABILITY PROFILE | DECAY PERIOD |
|---|---|---|
| DAN | 24 | 48 |
| DAVE | 0 | 24 |
| ⋮ | ⋮ | ⋮ |
| DANIELLE | 48 | 72 |

CONTENT AVAILABILITY MODIFICATION

BACKGROUND

Many social media platforms utilize methods to share content, such as photos, videos, and text messages for a restricted amount of time from a first posting or sharing of such content by a user. After a set decay period has passed, such as one day or 24 hours from the posting, the content may become unavailable to be viewed by an intended audience. This transient type of social media sharing of content has been extended into many different forms of communication, such as marketing campaigns and advertising.

SUMMARY

A computer implemented method includes receiving ephemeral digital information from a source user, providing access to the ephemeral digital information to one or more recipient users in accordance with a time decay value, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

A machine-readable storage device has instructions for execution by a processor of a machine to cause the processor to perform operations to perform a method. The operations include providing access to the ephemeral digital information to one or more recipient users in accordance with a time decay value, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

A device includes a processor and a memory device coupled to the processor and having a program stored thereon for execution by the processor to perform operations. The operations include providing access to the ephemeral digital information to one or more recipient users in accordance with a time decay value, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

DETAILED DESCRIPTION

Figures 1, 2:
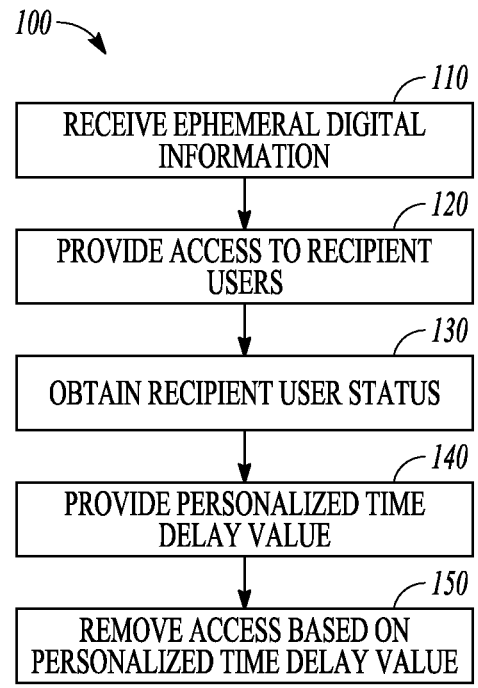
FIG. 1 is a flowchart illustrating a computer implemented method of ensuring availability of temporally transient information according to an example embodiment.
FIG. 2 is a relationship lookup table illustrating a relationship between a source user and potential viewers according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture,"

as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. The terms computer-readable medium and storage device do not include wireless signals, such as carrier waves or other communication or transmission media to the extent signals, carrier waves, or other media are deemed too transitory.

In many social media and other communication hosts or platforms, data representative of content, such as images, videos, text, and other communications may posted or otherwise shared and may then be available to intended users, recipient users, for limited period of time. Oftentimes, recipient users may not be available to view the shared content during that limited period of time, a default decay time. A recipient user may be traveling, on vacation, out of range of a network connection, or otherwise unavailable to view the content. The timeframe that content is available for consumption by recipient users is not tailored to individuals.

While shared content may be sorted on various social media platforms based on prior frequency of interaction between users, the availability window may remain unchanged. Once the content is gone, a potential viewer may miss seeing the content, and may not even realize that they missed seeing the content. A potential viewer that is also an infrequent user of a social media platform may miss content that they would have liked to see. In some cases, the potential viewer may have a close relationship to a posting user and may desire to see content from that posting user. With a fixed limited window of availability, the posted content is easily gone by the time the potential viewer checks for content.

In various embodiments, a default content decay period value for posted or shared content is modified based on information about one or more potential viewers. The information may include one or more of recipient user availability and a relationship with a posting user. Recipient user availability may be obtained from a recipient user calendar via a content posting platform. The decay period value may be increased as a function of unavailability of the recipient user as reflected by the recipient user calendar. In some embodiments, the posting user may provide unavailability data if the posting user is aware that a recipient user is unavailable. Examples might include a vacation, flight, or other activity without connectivity, which can be known by a source or posting user or obtained from the recipient user's calendar.

In further embodiments, the decay period value may be increased based on a known relationship between a posting user and a recipient user. The relationship may be derived as a function of the frequency and/or number of views of posted content between the users, or may be specified by one or more of the users as a relationship coefficient value. The relationship coefficient value may be used to extend the decay period value. In still further embodiment, both the unavailability data and the relationship data may be used to modify the content decay period value. The content decay period value may be increased by adding or otherwise combining values in various embodiments.

FIG. 1 is a flowchart illustrating a computer implemented method 100 of ensuring availability of temporally transient information. Method 100 includes receiving ephemeral digital information from a source user at operation 110. The ephemeral digital information may be intended for one or more recipient users, such as in the form a post or uploading of text, images, videos, or other content. Ephemeral digital information is temporally transient information that is available for downloading or otherwise viewing for a limited amount of time, referred to as a window or a time decay value. In some social media platforms, the time decay value is fixed, such as at 24 hours, or for a time otherwise settable by a user.

At operation 120 access to the ephemeral digital information is provided to one or more recipient users in accordance with a time decay value. The access may be provided by sending the recipient user or users a link to the information, updating social media feeds for the recipient user, or otherwise making the information available to the user, such as via an application running on user equipment. The user equipment may be a cellular phone, tablet, laptop computer, desktop computer or other device capable of providing information/content to the recipient users.

At operation 130, recipient status data corresponding to one or more of the recipient users is obtained. The recipient status data is one or more of relationship data corresponding to a relationship between the source user and the one or more recipients, or recipient user availability data corresponding to a recipient user being unavailable for a specified amount of time.

The time decay value of the ephemeral data is modified at operation 140 to provide a personalized time decay value for at least one of the one or more recipient users based on the recipient status data such that at least one recipient user is able to obtain access to the ephemeral digital information based on their personalized time decay value. The time decay value may be modified as a function of the specified amount of time to calculate the personalized time decay value.

As time passes after receipt of the ephemeral digital information at operation 110, access to the ephemeral digital information is removed at operation 150 for each recipient user based on their personalized time decay value. For example, a first recipient user may have a personalized time decay value of 36 hours, while a second recipient user has a personalized time decay value of 28 hours. 28 hours after a source user posts ephemeral digital information, access by the second recipient user is removed. 8 hours later, access by the first recipient user is removed.

In one or more embodiments, the relationship data comprises a relationship score. FIG. 2 shows a lookup table 200 consisting of columns and rows. Potential viewers are shown in a first column 210 as Dan, Dave, Dina . . . Danielle and a soccer group. A second column 220 includes the relationship score associated with each potential viewer 210. A third column 230 shows a decay period associated with each potential viewer 210 based on their relationship score 220.

The time decay value may be increased by a value associated with the relationship score 220. The personalized time decay value may be determined by a value associated with the relationship score via the lookup table 200, or may be selectable by the source user. The relationship score may be calculated as a function of frequency of viewing of prior received source user data by a recipient user or may be selected by a source user. In one embodiment, the relationship score is a value between 0 and 1, with 1 being designated a close relationship and 0 being associated with a distant relationship. The decay period 230 reflects the designations, with a score of 0.99 resolving to a decay period of 30 hours, while a score of 0.11 resolves to a decay period of 7 hours.

The decay period may be added to a default decay period to calculate the personalized decay period, or may simply be used as the personalized decay period. The default decay period may be 24 hours in one embodiment, but may differ in further embodiments and differ for various social media and other communication platforms. The relationship between the relationship score and decay period may be linear in some embodiments or may be an arbitrary, linear or non-linear function. The source user may alternatively directly select a personalized time decay value for a recipient user or group of recipient users, such as a group of friends, a shared interest group, relatives, etc. The personalized time decay value may also be associated with a group of recipient users as shown at row 240 of table 200 with a soccer group having a relationship score of 0.6 and a decay period of 20 hours. The soccer group may include Dave and Dina, each listed as individual viewers. The decay period value for Dave and Dina may be modified to be the longer of the group value and their individually indicated decay periods.

The relationship score may be calculated as a function of interactions between a potential viewer and the source user. In one embodiment, the relationship score is determined based on the number and/or frequency of views by the potential viewer of source user posts of ephemeral data, and may also include other direct interactions between the source user and the potential viewer. For example, if the potential viewer views all, or a selected number of posts of ephemeral data by the source user, the relationship score may be set to 1 or 0.99, a highest score.

The score value may decrease with a decreasing frequency of viewing posts, referred to as clicks. The decrease may be linear, such that viewing of half the posts will result in a relationship score of 0.5, and no viewing of posts may result in a relationship score of 0, or 0.01, which may result in no modification of the default decay value.

Many other factors may be used to derive the relationship score, including but not limited to length of engagement with posts, rate of scroll of posts, comments on posts, likes of posts, and other engagement factors indicative of an interest in the source user's posts. Note that the source user can alternatively set a relationship score for recipient users, either directly, but modifying the relationship score, decay period, or setting the personalized decay period. In further embodiments, the source user may select from a menu of relationships, such as close friend, casual friend, sister, brother, mom, dad, child, spouse, etc., which may each have an associated default decay period 230.

Figures 3, 4:
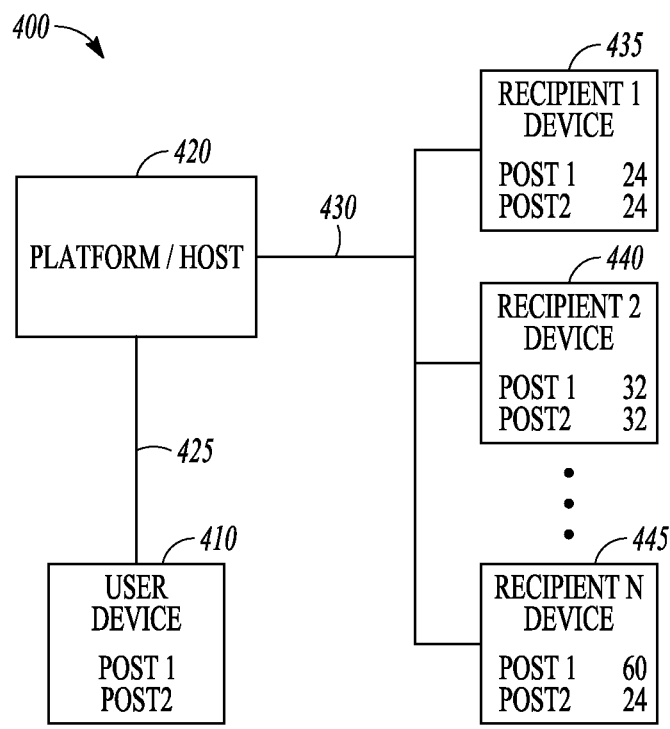
FIG. 3 is an availability lookup table illustrating availability of potential viewers according to an example embodiment.
FIG. 4 block diagram of a system for sharing ephemeral information with personalized time decays is according to an example embodiment.

FIG. 3 is a table 300 used to determine additional decay time to add for posted content decay times. Table 300 includes a viewer column 310, an availability profile column 320, and a decay period column 330. In one example as shown in table 300, viewer Dan has an availability profile of 24, and a personalized decay of 48. Dave is available with no time added to a default time decay of 24 hours, while Danielle is not available for 48 hours resulting in a 72-hour personalized decay period. The default time decay of 24 hours is used as an example default value. Different default time decay values, referred to as x, may be used in further embodiments, and may differ for different social media and other communication platforms.

In this example, the availability profile is a time, y, to add to the default decay, x, to produce the personalized decay of x+y. The availability profile may be dynamic, depending on many different factors, such as calendar events, device network availability, device being powered on, etc. The decay period column in a further embodiment may be a score similar to a relationship score as opposed to a discrete time value to add to the default decay time.

The user availability data may be obtained from a recipient user electronic calendar specifying a duration of events or from a user busy indicator, or by detecting that a user device is inactive. The user device, may be detected as inactive by using a heartbeat signal and not receiving a response. The user device may be powered down, not unlocked, in sleep mode, etc. The user device may also be providing an out of office notification that specifies a return time. The personalized decay value may be extended such that availability of the ephemeral data for the associated user does not decay before the user is expected to again be available to view the ephemeral data. The source user may also manually set the personalized decay time before posting or after posting in response to receiving the out of office notification.

In a further embodiment, the personalized decay time is a function of both the availability and the relationship scores. Additional decay time from both scores may be added to the default decay time to form the personalized decay time. In some embodiments, the relationship score may be used as a weighting factor used as a multiplier applied either to the default decay time or the personalized decay time derived from the availability table 300.

In one embodiment, when a user posts content, tables 200 and 300 may be consulted during the post and provide personalized decay times in association with the post such that the decay times for each recipient user are provided to a content host set at the time of posting. In further embodiments, the source user may receive an out of office notification from other communications, such as an email out of office reply to an email sent to a recipient user. The source user may then change the decay time for the recipient user for one or more existing posts via a host for the posts, or in the tables 200, 300 which the host periodically monitors such that the personalized decay times are modifiable both prior to posting or after posting. The source user may alternatively or in addition, change the decay time for a group in which the recipient user is a member. In one embodiment multiple instances of the tables may be kept, such as an instance for each post, such that the source user can selectively extend decay periods by both recipient user and by post. Alternatively, a single table could be used with duplicate rows or columns such that each post may have an individualized decay period for each recipient user.

FIG. 4 is a block diagram illustrating a system 400 for utilizing personalized decay time for posted content. A user device 410 is shown with post 1 and post 2 that have been sent to a social media platform or host 420 via a network connection 425. The posts are made available via a network connection 430 to a plurality of user recipient user devices 1, 2 . . . N, indicated at 435, 440, and 445. Recipient 1 device 435 shows personalized decay time values of 24 hours for both posts. No time has been added to the default decay period. Recipient 2 device 440 shows a decay time values of 32 hours, with 8 hours added to each post. Recipient N device 445 shows a decay time value of 60 hours for post 1 and 24 hours for post 2. The discrepancy in decay time value between this recipient and other recipients for post 1 may be due to recipient N being part of a group for which the decay period was extended by source user. In one embodiment, the source user manually set the decay time for post 1 for recipient N to ensure that recipient N had extra time to see the post.

In one embodiment, the availability of temporary content is modified or extended so that the time frame of consumability is tailored to the viewer and their availability. A source user shares ephemeral content, such as a 24 hour Snapchat story picture. Users in a network are evaluated for availability in real time. The ephemeral content time frame of consumability is adjusted to fit each viewing user resulting in all users in the network having equal opportunity to view shared content based on dynamic user availability.

In one example, Mark may live in Raleigh and posts a video of himself riding his motorcycle at 8 PM EST. One of Mark's friends, Jim lives in New York City. A user availability profile shows that Jim has a flight to La Paz, Bolivia the next morning. The flight is an 11-hour flight. Jim will not have an internet connection and will not be able to view the social media positing while in flight. The content that Mark posted is made available 11 hours longer for only Jim based on Jim's availability profile. Others in Mark's viewing social network may or may not have the availability extended based on their availability profiles.

The availability profile may contain other information or factors to be considered in extending the viewability of posted content, such as time of active use, sleeping, driving, etc., calendar events—meetings, doctor appointments, etc., lack of access to content—flying, lack of cell service, etc., and time zone differences.

In a further embodiment, relationship information between a source user posting content and potential viewers is leveraged to adjust the decay period of a content sharing window. The decay period is dynamically determined based on a relationship score, calculated by frequency of interactions (from either user perspective—source user to viewer and viewer to source user). A personalized decay rate of the shared content is based on the strength of the relationship socre. For example, if a viewer almost always clicks on a particular source user's posts, the window of availability may be extended from the default time period. The range of the time extension may be controlled by the source user, poster, to preserve some measure of control. Groups may also be created to apply time profiles in an inclusively targeted manner.

Figure 5:
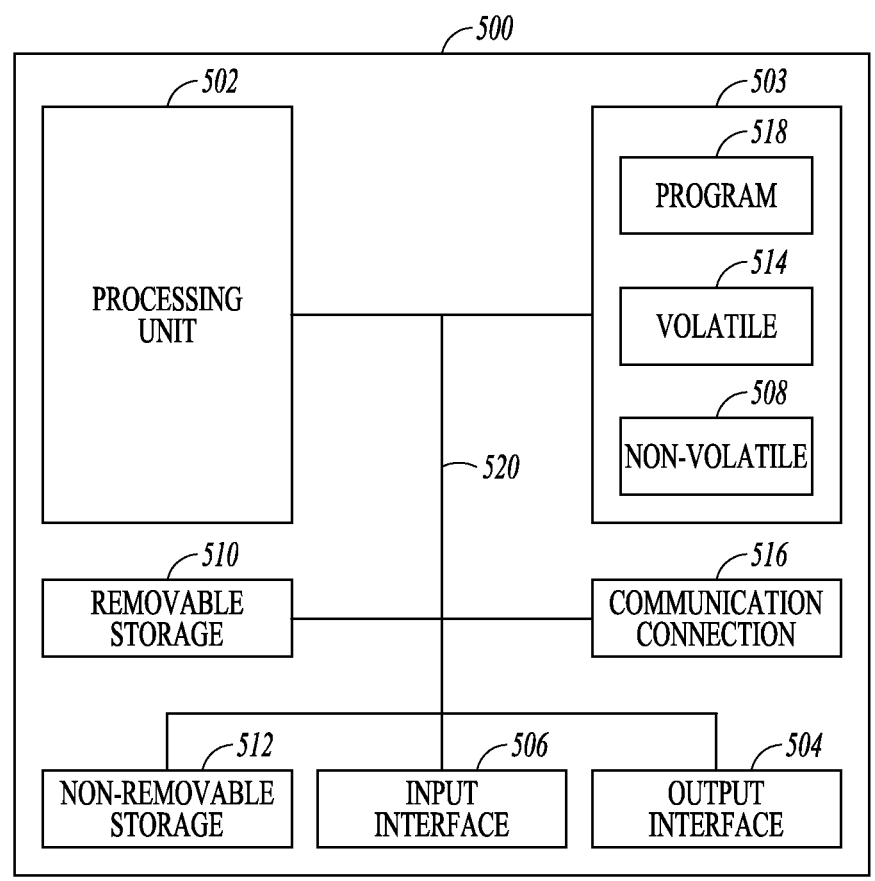
FIG. 5 is a block schematic diagram of a computer system to implement one or more example embodiments.

FIG. 5 is a block schematic diagram of a computer system 500 to implement and manage the use of availability and relationship factors in providing personalized time decay values for viewing shared content and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers, social media platforms and hosts. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more of the methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes receiving ephemeral digital information from a source user, providing access to the ephemeral digital information to one or more recipient users in accordance with a time decay, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

2. The method of example 1 wherein the recipient status data comprises relationship data corresponding to a relationship between the source user and the one or more recipients.

3. The method of example 2 wherein the relationship data comprises a relationship score.

4. The method of example 3 wherein the time decay value is increased by a value associated with the relationship score.

5. The method of any of examples 3-4 wherein the personalized time decay value is determined by a value associated with the relationship score via a lookup table.

6. The method of any of examples 3-5 wherein the relationship score is selectable by the source user.

7. The method of any of examples 3-6 wherein the relationship score is calculated as a function of frequency of viewing of prior received source user data by a recipient user.

8. The method of any of examples 1-7 wherein the recipient status data comprises a source user selected personalized time decay value.

9. The method of any of examples 1-8 wherein the personalized time decay value is associated with a group of recipient users.

10. The method of any of examples 1-9 wherein the recipient status data comprises recipient user availability data corresponding to a recipient user being unavailable for a specified amount of time, and wherein the time decay value is modified as a function of the specified amount of time to obtain the personalized time decay value.

11. The method of example 10 wherein the user availability data is obtained from a user electronic calendar specifying a duration of events or from a user busy indicator.

12. The method of any of examples 10-11 wherein the user availability data is obtained by detecting that a user device is inactive.

13. The method of any of examples 1-12 wherein the time decay value is associated with the ephemeral data.

14. A machine-readable storage device has instructions for execution by a processor of a machine to cause the processor to perform operations to perform a method. The operations include providing access to the ephemeral digital information to one or more recipient users in accordance with a time decay value, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

15. The device of example 14 wherein the recipient status data comprises relationship data corresponding to a relationship between the source user and the one or more recipients.

16. The device of example 15 wherein the relationship data comprises a relationship score and wherein the time decay value is increased by a value associated with the relationship score and wherein the relationship score is calculated as a function of frequency of viewing of prior received source user data by a recipient user.

17. The device of any of examples 14-16 wherein the personalized time decay value is associated with a group of recipient users.

18. The device of any of examples 14-17 wherein the recipient status data comprises recipient user availability data corresponding to a recipient user being unavailable for a specified amount of time, and wherein the time decay value is modified as a function of the specified amount of time to obtain the personalized time decay value.

19. The device of example 18 wherein the user availability data is obtained from a user electronic calendar specifying a duration of events or from a user busy indicator, or by detecting that a user device is inactive.

20. A device includes a processor and a memory device coupled to the processor and having a program stored thereon for execution by the processor to perform operations. The operations include providing access to the ephemeral digital information to one or more recipient users in accordance with a time decay value, obtaining recipient status data corresponding to one or more of the recipient users, and modifying the time decay value of the ephemeral data to provide a personalized time decay value for at least one of the one or more recipient users based on the recipient status data such that at least one recipient user is able to obtain access to the ephemeral digital information based on their personalized time decay value.

21. The device of example 22 wherein the recipient status data comprises one or more of relationship data corresponding to a relationship between the source user and the one or more recipients, and recipient user availability data corresponding to a recipient user being unavailable for a specified amount of time.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving ephemeral digital information from a source user;
providing access to the ephemeral digital information to one or more recipient users in accordance with a time decay value;
obtaining recipient status relationship data corresponding to a relationship between the source user and one or more of the recipient users wherein the relationship data comprises a relationship score calculated as a function of frequency of viewing of prior received source user data by a recipient user; and
modifying the time decay value of the ephemeral data to provide a personalized time decay value for at least one of the one or more recipient users based on the recipient status data such that at least one recipient user is able to obtain access to the ephemeral digital information based on their personalized time decay value.

2. The method of claim 1 wherein the time decay value is increased by a value associated with the relationship score.

3. The method of claim 1 wherein the personalized time decay value is determined by a value associated with the relationship score via a lookup table.

4. The method of claim 1 wherein the relationship score is selectable by the source user.

5. The method of claim 1 wherein the recipient status data comprises a source user selected personalized time decay value.

6. The method of claim 1 wherein the personalized time decay value is associated with a group of recipient users.

7. The method of claim 1 wherein the recipient status data comprises recipient user availability data corresponding to a recipient user being unavailable for a specified amount of time, and wherein the time decay value is modified as a function of the specified amount of time to obtain the personalized time decay value.

8. The method of claim 7 wherein the user availability data is obtained from a user electronic calendar specifying a duration of events or from a user busy indicator.

9. The method of claim 7 wherein the user availability data is obtained by detecting that a user device is inactive.

10. The method of claim 1 wherein the time decay value is associated with the ephemeral data.

11. A machine-readable storage device having instructions for execution by a processor of a machine for the processor to perform operations comprising:
   receiving ephemeral digital information from a source user;
   providing access to the ephemeral digital information to one or more recipient users in accordance with a time decay value associated with the ephemeral digital information;
   obtaining recipient status relationship data corresponding to a relationship between the source user and one or more of the recipient users wherein the relationship data comprises a relationship score calculated as a function of frequency of viewing of prior received source user data by a recipient user; and
   modifying the time decay value of the ephemeral data to provide a personalized time decay value for at least one of the one or more recipient users based on the recipient status data such that at least one recipient user is able to obtain access to the ephemeral digital information based on their personalized time decay value.

12. The device of claim 11 wherein the personalized time decay value is associated with a group of recipient users.

13. The device of claim 11 wherein the recipient status data comprises recipient user availability data corresponding to a recipient user being unavailable for a specified amount of time, and wherein the time decay value is modified as a function of the specified amount of time to obtain the personalized time decay value.

14. The device of claim 13 wherein the user availability data is obtained from a user electronic calendar specifying a duration of events or from a user busy indicator, or by detecting that a user device is inactive.

15. A device comprising:
   a processor; and
   a memory device coupled to the processor and having a program stored thereon for execution by the processor to perform operations comprising:
      receiving ephemeral digital information from a source user;
      providing access to the ephemeral digital information to one or more recipient users in accordance with a time decay value associated with the ephemeral digital information;
      obtaining recipient status relationship data corresponding to a relationship between the source user and one or more of the recipient users wherein the relationship data comprises a relationship score calculated as a function of frequency of viewinq of prior received source user data by a recipient user; and
      modifying the time decay value of the ephemeral data to provide a personalized time decay value for at least one of the one or more recipient users based on the recipient status data such that at least one recipient user is able to obtain access to the ephemeral digital information based on their personalized time decay value.

* * * * *